US012597150B2

(12) United States Patent (10) Patent No.: US 12,597,150 B2

Teyssier et al. (45) Date of Patent: Apr. 7, 2026

(54) OBTAINING A DEPTH MAP

(71) Applicant: STMicroelectronics (Grenoble 2) SAS, Grenoble (FR)

(72) Inventors: Jeremie Teyssier, Grenoble (FR); Cedric Tubert, Saint-Egreve (FR); Thibault Augey, Grenoble (FR); Thomas Bouchet, Fontanil-Cornillon (FR)

( * ) Notice: Subject to any disclaimer, the term of this patent is extended or adjusted under 35 U.S.C. 154(b) by 221 days.

(21) Appl. No.: 18/531,192

(22) Filed: Dec. 6, 2023

(65) Prior Publication Data

US 2024/0202945 A1 Jun. 20, 2024

(30) Foreign Application Priority Data

Dec. 14, 2022 (EP) .................................... 22306871

(51) Int. Cl.
| | |
|---|---|
| *G06T 7/50* | (2017.01) |
| *G06V 10/74* | (2022.01) |
| *G06V 10/764* | (2022.01) |

(52) U.S. Cl.
CPC .............. *G06T 7/50* (2017.01); *G06V 10/761* (2022.01); *G06V 10/764* (2022.01)

(58) Field of Classification Search
CPC ........... G06T 2207/10028; G06T 7/593; G06T 17/20; G06T 19/006; G06T 7/11; G06T 7/50; G06T 2207/10012; G06T 2207/10016; G06T 2207/20021; G06T 2207/20081; G06T 2207/20084; G06T 15/20; G06T 17/205; G06T 2207/10048; G06T 2207/10024; G06T 7/0002; G06T 2207/30232; G06T 15/06; G06T 15/08; G06T 15/405; G06T 19/00; G06T 2210/12; G06T 2219/004; G06T 7/187; G06T 2207/20076; G06T 7/586; G06T 1/60; G06T 2207/10021; G06T 2207/10152; G06T 2207/30252; G06T 7/514; G06T 7/194; G06T 7/254; G06T 2210/41; G06T 7/20; G06T 7/55; G06F 3/012;

(Continued)

(56) References Cited

U.S. PATENT DOCUMENTS

| | | | | |
|---|---|---|---|---|
| 8,902,283 B2 * | 12/2014 | Bae | ...................... | H04N 13/261 |
| | | | | 348/42 |
| 2012/0195492 A1 * | 8/2012 | Ali | ........................... | G06T 5/20 |
| | | | | 382/154 |

(Continued)

*Primary Examiner* — Alex Kok S Liew

(74) *Attorney, Agent, or Firm* — Slater Matsil, LLP

(57) ABSTRACT

A method comprises, for each pixel of a depth map, acquiring samples and calculating a distance, and defining a window of N*N pixels with this image pixel at the center, N being an odd integer equal to or greater than 3, and, for each window, classifying the pixels of the window into groups, based on a threshold and distances calculated, calculating for each group, a number of pixels in the group, a confidence factor of the group equal to a sum of the confidence factors of the pixels each determined from the samples acquired for the pixel, and scanning the window from the central pixel by comparing, for each pixel, the confidence factor of the group of the pixel with a threshold and the number of pixels of the group of the pixel with another threshold, and determining whether the central pixel is retained, replaced or discarded.

20 Claims, 4 Drawing Sheets

(58) Field of Classification Search
CPC .......... G06F 3/011; G06F 3/013; G06F 3/017;
G06F 3/0304; G06F 3/04815; G06F
3/04842; G06F 3/0482; G06F 18/2415;
G06F 1/325
See application file for complete search history.

(56) References Cited

U.S. PATENT DOCUMENTS

| | | | |
|---|---|---|---|
| 2013/0051657 A1* | 2/2013 | Ostermann .......... | G06V 10/758 |
| | | | 382/154 |
| 2014/0362163 A1* | 12/2014 | Winterstein ............. | H04N 7/15 |
| | | | 348/14.07 |

* cited by examiner

500

Pix_im

OBTAINING A DEPTH MAP

CROSS-REFERENCE TO RELATED APPLICATIONS

This application claims the priority benefit of European patent application No. 22306871, filed on Dec. 14, 2022, entitled "Obtention d'une carte de profondeur," which application is hereby incorporated herein by reference to the maximum extent allowable by law.

TECHNICAL FIELD

The present disclosure generally relates to acquiring a depth map and, more particularly, a method of obtaining of a depth map by an indirect Time of Flight (iToF) sensor.

BACKGROUND

To obtain a depth map of a scene to be imaged, known methods are based on a measurement of indirect time of flight. In these known methods, each imager pixel of a pixel array of an indirect time of flight sensor acquire samples during a phase of acquiring the scene to be imaged during which the scene is irradiated with a frequency-modulated light signal. For each imager pixel, a phase shift between the signal irradiating the scene and the signal reflected from the scene and received by the pixel is determined from the samples acquired by the pixel, and a distance is determined from this phase shift. The depth map of the scene, comprising an image pixel array, is obtained by associating, with each image pixel, the distance calculated by the imager pixel corresponding to this image pixel.

However, for at least some image pixels of the depth map, the calculated distance is inconsistent with the calculated distances for the neighboring image pixels, for example due to an error in the calculation of the distance for example resulting from an error in a step of phase unwrapping, or due to the strength of the light reflected signal received by the imager pixel being too weak as compared to the ambient light strength.

SUMMARY

There is a need to address all or some of the drawbacks of the known methods of obtaining a depth map by a process of measurement of indirect time of flight.

For example, there is a need to detect, in a depth map, image pixels corresponding to the calculated distances inconsistent with the calculated distances for neighboring image pixels.

For example, there is a need to correct the distances of at least some of the image pixels of a depth map corresponding to inconsistent calculated distances.

For example, there is a need to discarded from a depth map the image pixels corresponding to inconsistent calculated distances being not corrected.

One embodiment addresses all or some of the drawbacks of the known methods of obtaining a depth map by a process of measurement of indirect time of flight.

For example, an embodiment allows detecting in a depth map, image pixels corresponding to calculated distances inconsistent with the calculated distances for neighboring image pixels.

For example, an embodiment allows correcting the distances of at least some of the image pixels of a depth map corresponding to inconsistent calculated distances.

For example, an embodiment allows discarding from a depth map the image pixels corresponding to inconsistent calculated distances being not corrected.

One embodiment provides a method comprising the following steps:

a) for each image pixel of a depth map:
  a1) acquiring samples via a corresponding imager pixel and calculating a distance from the samples, and
  a2) defining a window of N*N image pixels with the image pixel at the center of the window, N being an odd integer equal to or greater than 3;

b) for each window:
  b1) classifying the image pixels of the window into groups, the groups and the classification of the image pixels into the groups being determined by a distance threshold and the distances calculated for the image pixels of the window,
  b2) for each group of the window:
    calculating a number of image pixels in the group, and
    calculating a confidence factor of each image pixel and a confidence factor of the group equal to a sum of the confidence factors of the image pixels of the group, the confidence factor of each pixel being determined from the samples acquired for the image pixel, and
  b3) scanning the image pixels of the window from the central image pixel by comparing, for each scanned image pixel, the confidence factor of the group of the image pixel with a first threshold and the number of pixels of the group of the pixel with a second threshold, and determining whether the central pixel is maintained or replaced with another image pixel of the window or discarded from the depth map on the basis of the results of the comparisons.

According to one embodiment, in step b1), each group corresponds to a range of distances, and each image pixel of the window is classified into a group if the calculated distance for the image pixel is comprised in the range of distances of the group.

According to one embodiment, each range of distances has a width equal to twice the distance threshold, and the range of distances of the group comprising the central pixel is centered on the distance calculated for the central pixel.

According to one embodiment, each imager pixel belongs to an array of imager pixels of an indirect time of flight sensor.

According to one embodiment, in step a1), acquiring samples comprises acquiring first samples when a scene to be imaged is irradiated by a signal at a first frequency, and second samples when the scene to be imaged is irradiated by a signal at a second frequency.

According to one embodiment, the highest of the first and second frequencies determines the distance threshold.

According to one embodiment, a maximum distance measurable without uncertainty using the highest of the first and second frequencies determines the distance threshold.

According to one embodiment, the distance threshold is equal to half the maximum distance measurable without uncertainty.

According to one embodiment, in step a1), calculating the distance comprises phase unwrapping.

According to one embodiment, in step b3), the scanning of the image pixels of the window is spiral-shaped.

According to one embodiment, the confidence factor of each image pixel is representative of the signal to noise ratio of the samples acquired in step a1) for this image pixel.

According to one embodiment, the confidence factor of each image pixel is the magnitude of a signal received by the corresponding imager pixel in step a1), or this squared magnitude divided by a dc component of the received signal.

According to one embodiment, the first threshold is empirically determined.

According to one embodiment, the second threshold is empirically determined.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Figure 1:
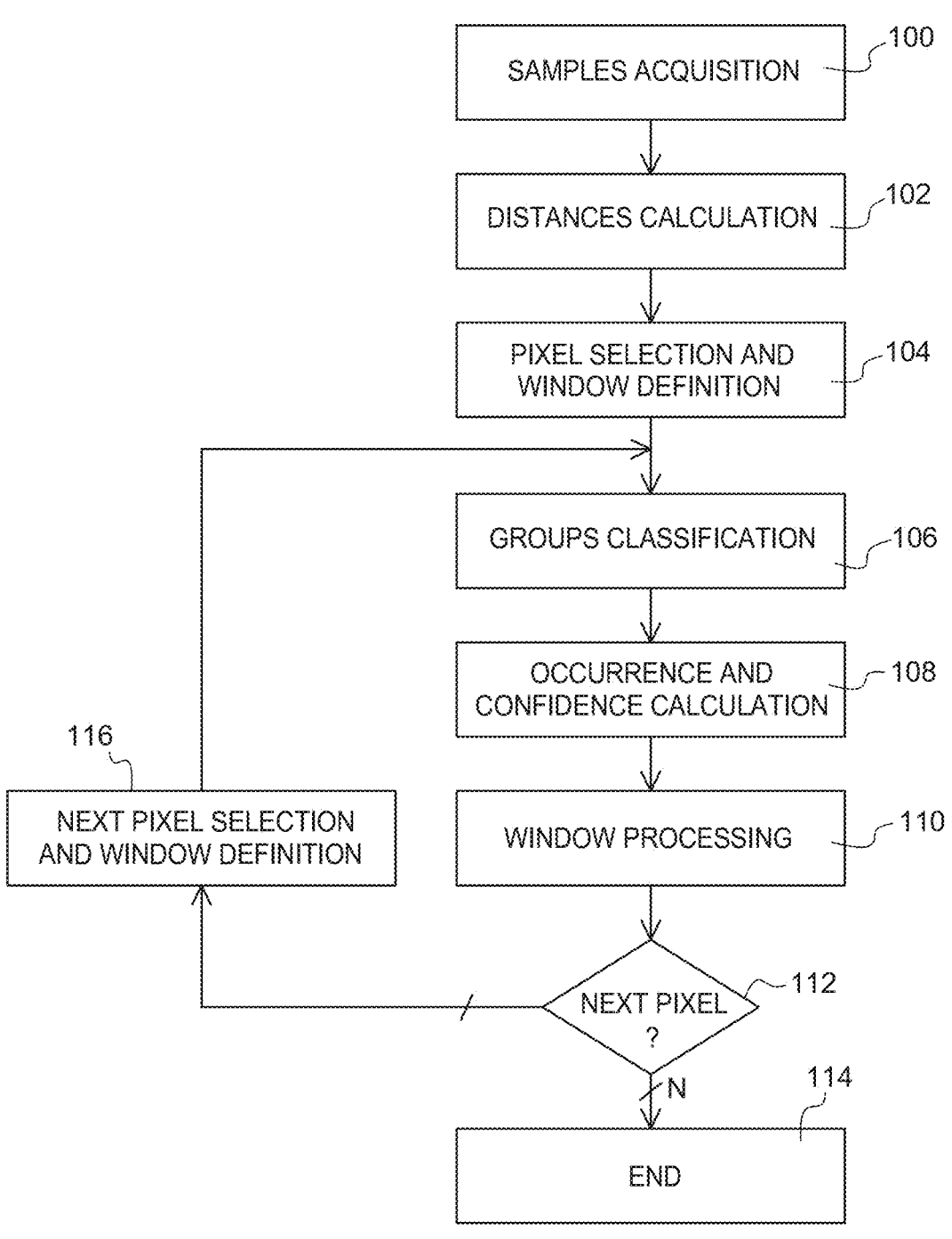
FIG. 1 illustrates, by a flowchart, an example embodiment of a method of obtaining a depth map.

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the known methods for acquiring samples by imager pixels of an iToF sensor during a phase of acquisition and calculation, for each imager pixel, of a distance from the acquired samples have not been detailed, the embodiments and alternatives described being conform to these known methods of acquisition and calculation.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

A method of obtaining of a depth map is provided. In this method, a depth map is obtained by a method of indirect time of flight, from samples acquired by imager pixels, each imager pixel allowing acquiring samples allowing calculating a distance for a corresponding image pixel in the depth map. The image pixels of the depth map are then processed in sequence to determine, for each image pixel, whether the calculated distance for this image pixel is consistent or not with the distances calculated for the neighboring image pixels. The processing of each image pixel comprises defining a window of image pixels around the image pixel being currently processed, and classifying the image pixels of the window in groups on the basis of a distance threshold of the calculated distances for the image pixels of the window. Then, the image pixels of the window are scanned in sequence from the image pixel being currently processed, i.e., from the central pixel of the window. During the scanning of the image pixels of the window, for each pixel, the number of pixels of the group of this image pixel is compared to a first threshold and a factor of the group of this pixel is compared to a second threshold. The factor of each group is, for example, representative of the signal to noise ratio of the pixels of the group and/or determined by the samples acquired by the imager pixels corresponding to the image pixels of the group. As a function of the results of the comparisons made for each of the scanned image pixels, the processed pixel, i.e., the central pixel of the window, is detected, or identified, as corresponding to an inconsistent calculated distance or not.

According to an embodiment, the pixels identified as corresponding to inconsistent calculated distances are discarded from the depth map, i.e., for example, the image pixels identified as being flying pixels are identified as such in the depth map.

According to another embodiment, among the image pixels identified as corresponding to inconsistent calculated distances, some are corrected and others are discarded from the depth map. Each correction of an image pixel for example comprises replacing the calculated distance for this image pixel with the calculated distance for another image pixel of the window defined around the corrected image pixel. This replacement is conditioned by the results of the comparisons made for this other image pixel.

FIG. 1 illustrates, by a flowchart, an example embodiment of such a method of obtaining a depth map.

In a step 100 (block "SAMPLES ACQUISITION"), a scene to be imaged is irradiated with a frequency-modulated light signal. The light signal is reflected from the scene to be imaged, and received by the imager pixels of a pixel array of an iToF sensor. Each imager pixel then acquires samples from which it is possible to determine a phase shift between the emitted light signal and the reflected light signal received by the imager pixel, this phase shift allowing a distance from the image pixel to the scene to be determined. As an example, each sample acquired by an imager pixel corresponds to a photogenerated charge sample in this imager pixel.

According to an embodiment, the phase of acquiring the samples comprises acquiring first samples as the scene is irradiated with a signal modulated at a first frequency, and acquiring second samples as the scene is irradiated with a signal modulated at a second frequency. The use of two modulating frequencies in order to irradiate the scene allows implementing a step of phase unwrapping during the calculation of the distances from the imager pixels to the scene. This phase unwrapping allows preserving a maximum distance measurable without ambiguity being determined by the lowest one among the modulation frequencies with an error in the calculated distance determined by the highest one among the modulation frequencies. Indeed, for a given modulation frequency, the acquired samples allow a modulo $2\pi$ phase shift to be determined, and the ambiguity introduced by the modulo $2\pi$ results in an ambiguity in the calculated distance.

According to an alternative embodiment, acquiring the samples by the imager pixels is performed when the scene is irradiated with a signal modulated at a single modulation frequency. In such case, there is no implementation of the phase unwrapping, the measurable maximum distance and the error in the measured distance, i.e., calculated from the acquired samples, are determined by this single modulation frequency.

Once the samples acquired, in a next step 102 (block "DISTANCES CALCULATIONS"), for each imager pixel, a distance from the pixel to the scene is calculated, this distance corresponding to an image pixel of a depth map. In other words, for each image pixel of the depth map, samples are acquired by an imager pixel corresponding to the step 100 and a distance is calculated from these samples in step 102. Thus, at the end of step 102, a depth map is obtained. However, in this depth map, some image pixels correspond to calculated distances that are inconsistent with the distances calculated for image pixels neighboring these image pixels. The image pixels corresponding to inconsistent calculated distances are for example called flying pixels.

In a next step 104 (block "PIXEL SELECTION AND WINDOW DEFINITION"), a first image pixel of the depth map obtained in step 102 is selected. This selected image pixel will then be processed in further steps 106, 108, and 110 hereinafter described in order to determine or identify whether this image pixel is a flying pixel corresponding to an inconsistent calculated distance (flying pixel), or whether this image pixel corresponds to a consistent calculated distance. To this end, in step 104, a window of N*N image pixels is defined around the selected image pixel, so that the selected image pixel is in the center of the N*N image pixel window, N being then an odd integer greater than or equal to 3. As an example, N is equal to 5.

In a next step 106 (block "GROUPS CLASSIFICATION"), the image pixels being part of the N*N image pixel window are classified into groups. Each image pixel of the N*N image pixel window is classified into the group corresponding to the range of distances to which the distance calculated for this image pixel belongs. As an example, the ranges of distances of the different groups may overlap each other, and a pixel of the window may thus belong to more than one group. More particularly, each group, i.e., the range of distances corresponding to this group, is determined by the distances calculated for the image pixels of the currently processed window, and by a distance threshold th_d.

Figure 2:
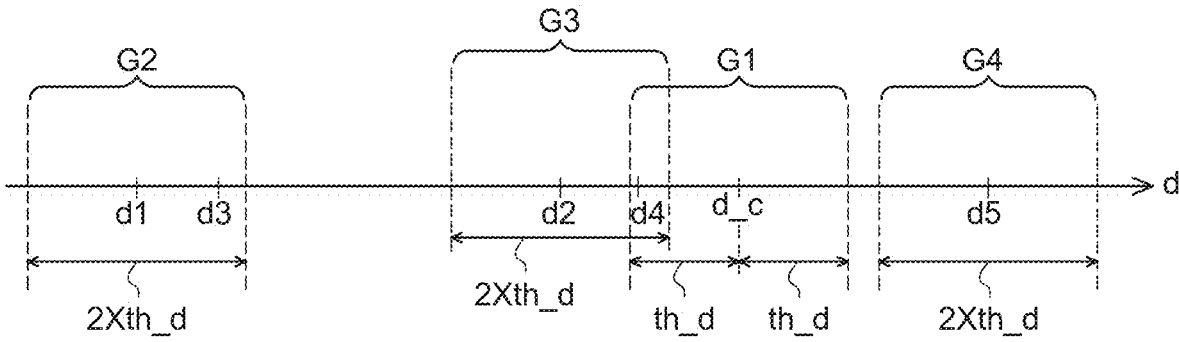
FIG. 2 illustrates in more detail an example embodiment of a step of the method of FIG. 1.

FIG. 2 illustrates in more detail an example embodiment of the step 106 of the method of FIG. 1, and more particularly, the manner the groups are determined, or in other words the manner the ranges of distances corresponding to these groups are determined.

FIG. 2 more particularly illustrates how the groups are determined from the distances calculated for the image pixels of the N*N image pixel window, and from the threshold th_d, or in other words how the ranges of distances d (x-axis in FIG. 2) of these groups are determined from the calculated distances and from the threshold th_d.

A first pixel of the window, preferably the central pixel of the window, is used to determine the first group (G1 in FIG. 2). The group G1 corresponds to a range of distances d having an extent equal to twice the threshold th_d and being centered on the calculated distance corresponding to this pixel.

Then, for each other pixel of the window successively, is verified whether the distance corresponding to this pixel is part of one or more existing groups Gi, where i is an integer index from 1 to M, and M is an integer corresponding to the whole number of groups already determined. In other words, for each group Gi is verified whether the distance corresponding to this pixel belongs to the distance range of the group Gi.

Whenever the pixel belongs to a group Gi, the pixel is added to this group, a pixel being possibly part of several groups as will be hereinafter detailed.

However, if the pixel belongs to none of the already determined M groups Gi, a new group Gi is determined (M is incremented by one unit), this new group Gi corresponding to a distance range having an extent equal to 2*th_d centered on the distance corresponding to this pixel. The range of distances d of this new group may overlap at least in part a range of distances d corresponding to one or more other groups Gi. Further, the pixel is classified into this new group.

As an example, during the determination of the M groups Gi of the N*N image pixel window, the pixels of the window are processed (or scanned) in sequence, for example starting with the central pixel of the window and, for example, following the same scanning as the one followed in step 110 of FIG. 1 that will be described in more detail below. However, in alternative examples, the first pixel of the window used to determine the M groups Gi of this window may be any other image pixel of the N*N image pixel window and/or the direction of the scanning of the pixels of the window to determine the M groups Gi may be different from the direction of the scanning of the pixels of the window used in step 110 of the method.

In the example of FIG. 2, the first pixel of the window used to determine the M groups Gi of the window is the central pixel of the window, corresponding to a distance d_c. Thus, the first determined group G1 corresponds to a range of distances d having a length equal to 2*th_d centered on the distance d_c.

Then, a second pixel of the window is processed, this second pixel corresponding to a distance d1. In this example, the distance d1 is not a part of the range of distances d corresponding to the group G1, and a group G2 is determined. The group G2 corresponds to a range of distances d having a length equal to 2*th_d centered on the distance d1. The second processed pixel thus belongs to the group G2. In this example, the distance ranges of the groups G1 and G2 do not overlap each other, although in alternative examples, it could have been so.

Then, a third pixel of the window is processed, this pixel corresponding to a distance d2. In this example, the distance d2 belongs neither to the range of distances d corresponding to the group G1, nor to the range of distances d corresponding to the group G2. Thus, a third group G3 is determined, this group G3 corresponding to a range of distances d having a length equal to 2*th_d centered on the distance d2. The third pixel belongs to the group G3. In this example, the range of distances d corresponding to the group G3 partly overlaps the range of distances d corresponding to the group G1, but not that corresponding to the group G2.

Then, a fourth pixel of the window is processed, this pixel corresponding to a distance d3. In this example, the distance d3 belongs to the range of distances d corresponding to the group G2, but does not belong to the ranges of distances d corresponding to the groups G2 and G3. The fourth pixel is thus added to the group G2.

Then, a fifth pixel of the window is processed, this pixel corresponding to a distance d4. In this example, the distance d4 belongs to the range of distances d corresponding to the group G1 and to the range of distances d corresponding to the group G3, but does not belong to the range of distances d corresponding to the group G2. The fifth pixel is thus added to each of the groups G1 and G3.

Then, a sixth pixel of the window is processed, this pixel corresponding to a distance d5. In this example, the distance d5 belongs to none of the ranges of distances d corresponding to the groups G1, G2, and G3. Thus a fourth group G4 is determined, this group G4 corresponding to a range of distances d having a length equal to 2*th_d centered on the distance d5. The sixth pixel belongs to the group G4. In this example, the range of distances d corresponding to the group G4 partly overlaps the range of distances d corresponding to the group G1, but not those corresponding to the groups G2 and G3.

Although it is not illustrated in FIG. 2, determining the groups Gi for classifying the image pixels of the N*N image pixel window goes on until all the pixels of the window are classified into one or more groups Gi.

In relation with FIG. 2, was described an example embodiment of classifying, for each N*N image pixel window, the image pixels of the window into groups Gi determined by the threshold th_d, and by the distances calculated for each of the pixels of the window.

In alternative embodiments of classifying, for each N*N image pixel window, the image pixels of the window are classified into groups Gi determined by the threshold th_d, and by the distances calculated for each of the pixels of the window. For example, can be provided that each group Gi corresponds to a range of distances d having a width equal to twice the threshold th_d being centered on a distance d equal to d_c+j*2*th_d, where j is an integer different for each group. At least one group Gi corresponds to the case where j is zero, and the central pixel is classified into this group. The other groups Gi, i.e., the groups corresponding to the non-zero values of j, are determined so that each image pixel of the N*N pixel window can be classified into a corresponding group Gi. In such an example, although two groups Gi may have contiguous distance ranges, these distance ranges do not overlap each other.

According to an embodiment, when the irradiation signal used in step 100 of FIG. 1 is modulated at a first frequency, and then at a second frequency, the distance threshold th_d is determined by the highest one of these two frequencies. More particularly, the highest one of the two frequencies allows measuring or calculating, without ambiguity related to the 2π modulo of the calculated phase shift, a maximum distance dmax equal to c/(2*f), where c is the speed of the light signal and f the value of the highest frequency among the first and second frequencies, and the threshold th_d is then determined by this maximum distance dmax measurable without ambiguity, nor uncertainty. For example, the threshold th_d is equal to dmax/2. This embodiment is generalizable to cases where the irradiation signal used in step 100 is sequentially modulated at more than two different frequencies. In this case, the highest one of these frequencies, for example the distance dmax corresponding to this frequency, then determines the threshold th_d, the threshold th_d being for example equal to dmax/2.

According to an alternative embodiment, that applies either as the signal used in step 100 is modulated, for example sequentially at several different frequencies, or as this signal is modulated at a single frequency, the threshold th_d is determined by a targeted maximum measurement error and/or empirically. Those skilled in the art will be able to determine this threshold th_d, for example depending on what is considered as being an inconsistent distance measurement.

Referring back to FIG. 1, in a next step 108 (block "OCCURRENCE AND CONFIDENCE CALCULATION"), a confidence factor is calculated for each image pixel of the N*N image pixel window, then a confidence factor of each of the groups determined in the previous step 106 is determined. For each group, the confidence factor of the group is equal to the addition of the confidence factors of the image pixels belonging to this group, i.e., the pixels of the N*N image pixel window that were classified into this group in the previous step 106.

The confidence factor of each image pixel is calculated from the samples acquired by the corresponding imager pixel in step 100. For example, the confidence factor of each image pixel is representative of the signal to noise ratio of the corresponding imager pixel during step 100.

Practically, during step 100, each imager pixel corresponding to an image pixel of the depth map receives a signal comprising a periodic component of the modulation frequency of the signal of scene irradiation and a dc component, for example at least in part determined by the ambient light. The magnitude of the periodic component and the value of the dc component are determinable from the acquired samples.

As an example, the confidence factor of each image pixel is the magnitude of the signal received by the corresponding imager pixel, i.e., the magnitude of the periodic component of this received signal. The magnitude of the signal received by an imager pixel is representative of the signal to noise ratio of the samples acquired by this imager pixel in step 100, because this signal to noise ratio is at least in part determined by this magnitude.

As an alternative example, the confidence factor of each image pixel is equal to the square of the magnitude of the signal received by the corresponding imager pixel, i.e., to the square of the magnitude of the periodic component of this received signal, divided by the value of the dc component of this received signal. The ratio of the square of the magnitude of the signal received by an imager pixel to the value of the dc component of this received signal is representative of the signal to noise ratio of the samples acquired by this imager pixel in step 100, because this signal to noise ratio is at least in part determined by this magnitude and by this dc component.

As another alternative example, the confidence factor of each image pixel is equal to the signal to noise ratio of the samples acquired in step 100 by the imager pixel corresponding to this image pixel, i.e., to the signal to noise ratio of the samples acquired in step 100 for this image pixel.

More generally, the confidence factor of each image pixel is for example at least in part determined by the magnitude of the periodic component of the reflected signal received by the imager pixel corresponding to this image pixel.

In step 108, in addition to calculating the confidence factor of each image pixel of the N*N image pixel window and of each group of image pixels determined in the previous step 106, the whole number of the image pixels classified into each group is calculated. In other words, for each group obtained at the end of the previous step 106, the step 108 comprises calculating the whole number of the image pixels classified into this group.

Figure 3:
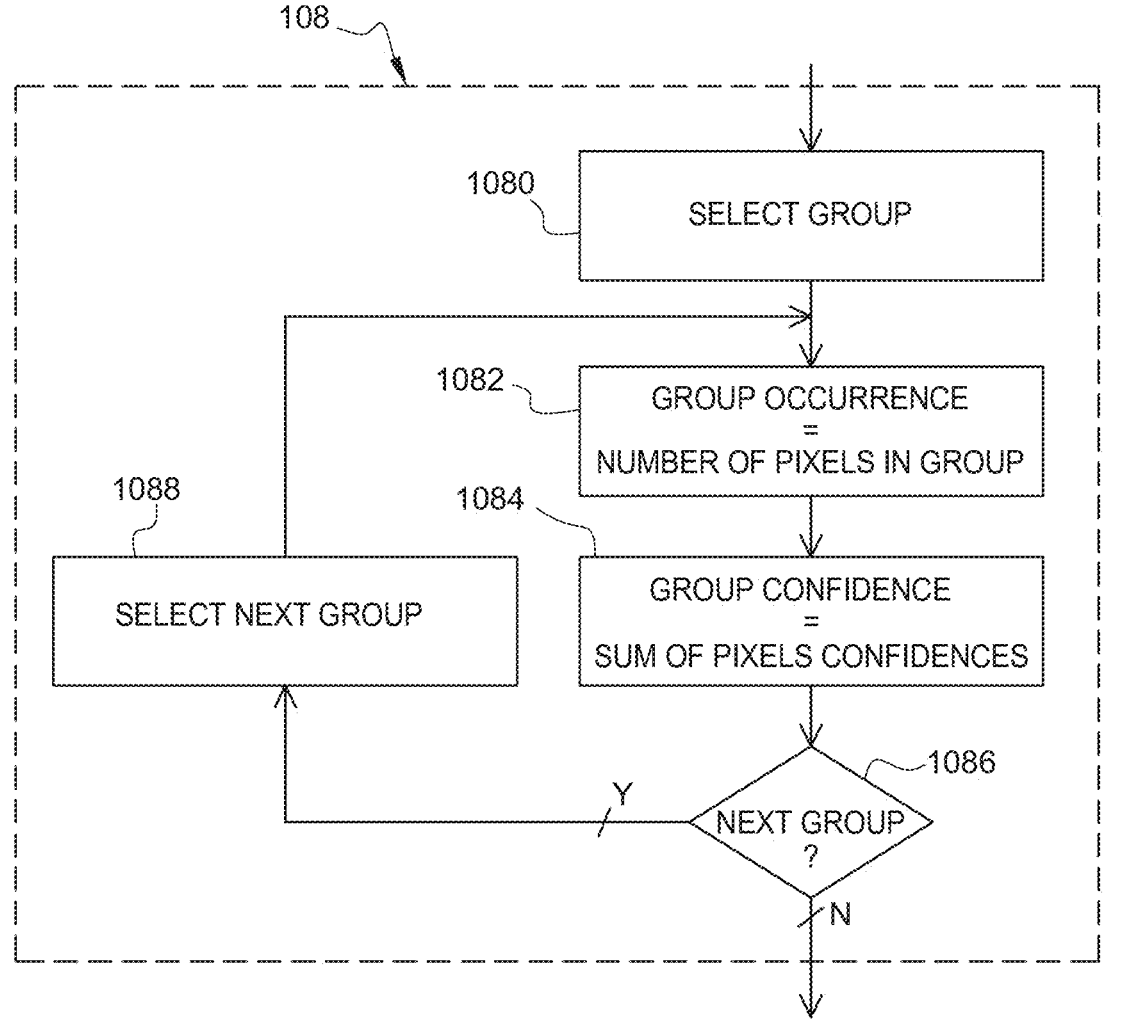
FIG. 3 illustrates in more detail an example embodiment of a step of the method of FIG. 1.

FIG. 3 illustrates in more detail and as a flowchart an example embodiment of the step 108 of the method of FIG. 1.

In this embodiment, the step 108 starts with a step 1080 (block "SELECT GROUP") of selecting one of the groups determined in the previous step 106.

In a next step 1082 (block "GROUP OCCURRENCE=NUMBER OF PIXELS IN GROUP"), the total number of the image pixels classified in step 106 of FIG. 1 in the selected group is calculated.

In a next step 1084 (block "GROUP CONFIDENCE=SUM OF PIXELS CONFIDENCES"), the confidence factor of the selected group is calculated and is equal to the sum of the confidence parameters of the image pixels classified into this group.

As an example, the confidence factor of each image pixel of the selected group is calculated at the start of the step 1084, or during the step during which this group is selected. As an alternative example, the confidence factor of each image pixel of the N*N image pixel window is calculated during the implementation of the previous step 108, or of the previous step 106, or yet during another step preceding the step 108, for example during the step 102 of FIG. 1.

In a next step 1086 (block "NEXT GROUP?"), a test determines whether it remains a group of image pixels for which the confidence factor and the whole number of the pixels in the group were not calculated.

If it is not the case (exit N of the step 1086), the step 108 is completed.

If it remains one or more groups of image pixels for which the confidence factor and the whole number of the pixels in the group were not calculated, the step 1086 is followed by a step 1088 (block "SELECT NEXT GROUP").

In step 1088, among the groups of image pixels determined in the previous step 106 (FIG. 1), a group of image pixels that has not yet been selected in step 108 is selected. In other words, in step 1088, a group of image pixels for which the confidence factor and the whole number of the pixels in the group were not calculated is selected.

Step 1088 is followed by the implementation of the steps 1082, 1084, and 1086, for example in this order in the example of FIG. 3, so that the confidence factor and the whole number of the pixels in the selected group are calculated.

Although in the example of FIG. 3 the step 1084 is implemented after the step 1082, the opposite is also possible, or these two steps 1082 and 1084 can be implemented at once (in parallel).

Although in the example of FIG. 3 the confidence factor of each group and the whole number of the pixels in each group are calculated in sequence, i.e., by selecting successively the groups of image pixels determined in the previous step 106 of FIG. 1, in other non-represented examples, the groups of pixels are processed in parallel so that the confidence factor of each of the groups is calculated for all groups of pixels at once, and that the whole number of the pixels per group is calculated for all groups of pixels at once.

Referring back to FIG. 1, in a next step 110 (block "WINDOW PROCESSING"), is implemented detecting, or identifying, that the image pixel currently processed, i.e., the central image pixel of the N*N image pixel window used during the previous steps 106 and 108, is a flying pixel or not.

To this end, the image pixels of the N*N image pixel window are sequentially scanned starting from the central pixel of the window, and moving away from this central pixel to move towards the image pixels on the sides of the window. In other words, the image pixels are scanned starting from the central image pixel, then moving away more and more from the central pixel. Preferably, the scanning of the image pixels of the window is spiral shaped, and more exactly a spiral starting from the central pixel of the window, or in other words, a spiral wrapped around the central pixel of the window.

Figure 5:
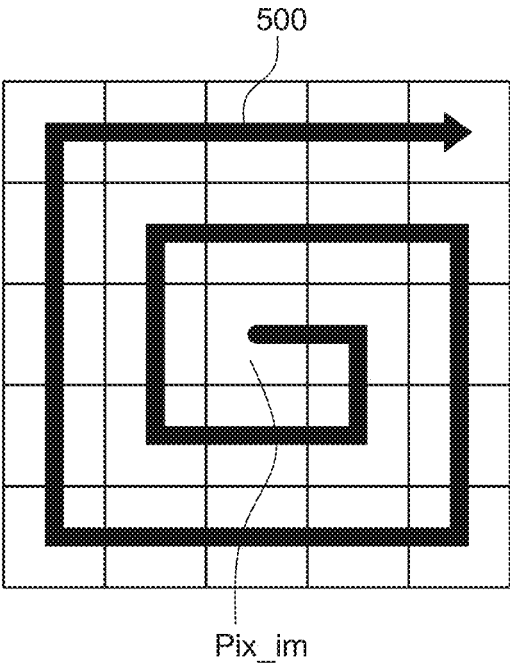
FIG. 5 illustrates an example of a detail of implementation of a step of the method of FIG. 1.

FIG. 5 illustrates an example of a detail of implementation of the step 110 of the method of FIG. 1, and more particularly an example embodiment of the manner the image pixels Pix_im of a N*N image pixel window are scanned in step 110. In order not to overload the figure, only the central pixel of the N*N pixel window is referenced in this figure.

In this example, N is equal to 5, although the present disclosure applies to other values of N being odd and greater than or equal to 3.

In FIG. 5, the scanning of the pixels of the window is illustrated with an arrow 500.

In the example of FIG. 5, the pixels Pix_im of the image pixel window are scanned following a spiral starting from the central pixel of the window and wrapping around this central pixel, in this example in the clockwise direction, although the anticlockwise direction is also possible.

Referring back to FIG. 1, and more particularly to the step 110 of FIG. 1, during the scanning of the image pixels of the N*N pixel window, for each image pixel scanned in the current N*N pixel window, two comparisons are implemented. More particularly, for each image pixel scanned, a first comparison consists in comparing with a threshold TH2 the whole number of the pixels in the group to which belongs this image pixel, i.e., the current image pixel of the current N*N pixel window. Further, for each image pixel scanned, a second comparison consists in comparing with a threshold TH1 the confidence factor of the group to which this image pixel belongs.

Considering again the example of FIG. 2, the central pixel of the current N*N image pixel window belongs to the group G1, and for this central pixel, the first comparison consists in comparing with the threshold TH2 the number of pixels in the group G1, and the second comparison consists in comparing with the threshold TH1 the confidence factor of the group G1.

In step 110, according to the results of the first and second comparisons implemented for each image pixel scanned in the N*N image pixel window, it is determined whether the central pixel of the window corresponds to the calculated or measured distance consistent with the calculated distances for the other image pixels of the current window or not. In the case where the central image pixel of the current window is not identified as a flying pixel, this image pixel is retained in the depth map.

According to an embodiment, when the central pixel of the current window is identified as a flying pixel corresponding to an inconsistent measured distance, this image pixel is discarded from the depth map.

According to another embodiment, when the central pixel of the current window is identified as a flying pixel corresponding to an inconsistent measured distance on the basis of the results of the first and second comparisons implemented for each image pixel scanned in the current window, it is determined whether this flying image pixel can be corrected by replacing it with another image pixel of the window in the depth map, or whether this flying image pixel cannot be corrected by replacing it with another image pixel of the window and is then discarded from the depth map.

As an example, when the confidence factor of the group of the central pixel of the current window is higher than the threshold TH1 and/or when the number of pixels in the group of the central pixel of the current window is higher than the threshold TH2, then the central pixel is not identified as a flying pixel. Oppositely, when the confidence factor when the confidence factor of the group of the central pixel of the current window is less than the threshold TH1 and that the number of pixels in the group of the central pixel of the current window is less than the threshold TH2, then the central pixel is identified as a flying pixel.

As an example, when the central pixel is identified as a flying pixel, in one embodiment wherein one tries correcting the central pixel before discarding it from the depth map, the central pixel is replaced, if possible, with another pixel of the current window for which the confidence factor of the group of this other pixel is higher than the threshold TH1 and/or for which the number of pixels in the group of this other pixel is higher than the threshold TH2. Preferably, this other pixel replacing the central pixel of the current window is the first pixel of the current window that is reached during the scanning of the current window for which the confidence factor of the group of this pixel is higher than the threshold TH1 and/or for which the number of pixels in the group of this pixel is higher than the threshold TH2. When there is no image pixel in the current window for which the confidence factor of the group of this other pixel is higher than the threshold TH1 and/or for which the number of pixels in the group of this other pixel is higher than the threshold TH2, then the central pixel identified as a flying pixel is not corrected and is discarded from the depth map.

According to an embodiment, the threshold TH1 is empirically determined, those skilled in the art being able to determine this threshold TH1 according to that they consider as an inconsistent distance measurement. In other words, the threshold TH1 is empirically determined based on a definition of what is an inconsistent calculated distance.

According to an embodiment, the threshold TH2 is empirically determined, those skilled in the art being able to determine this threshold TH2 according to that they consider as an inconsistent distance measurement. In other words, the threshold TH2 is empirically determined based on a definition of what is an inconsistent calculated distance.

Figure 4:
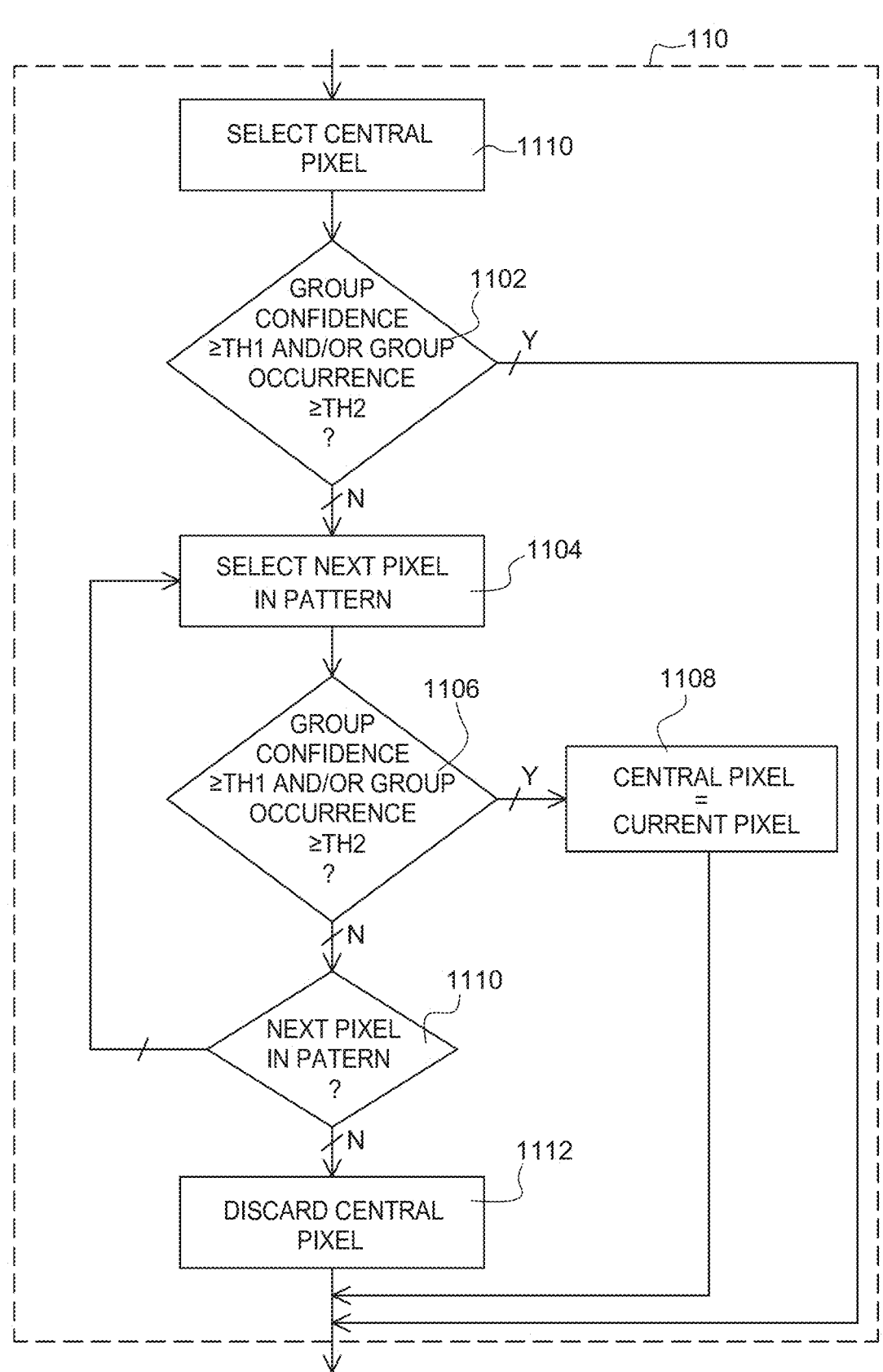
FIG. 4 illustrates in more detail an example embodiment of a step of the method of FIG. 1.

FIG. 4 illustrates in more detail an example embodiment of the step 110 of the method of FIG. 1. More particularly, FIG. 4 illustrates an example embodiment of the step 110 wherein, when the central pixel of the current window is identified as a flying pixel, a correction to the central pixel, i.e., a correction to the calculated distance corresponding to this central pixel, is implemented if possible.

The step 110 starts by a step 1100 (block "SELECT CENTRAL PIXEL") during which a pixel of the current N*N image pixel window is selected, this selected pixel corresponding to the central pixel in step 1000.

In a next step 1102 (block "GROUP CONFI-DENCE≥TH1, AND/OR GROUP OCCUR-RENCE≥TH2?"), the confidence factor of the group to which the selected pixel belongs, namely the central pixel in step 1102, is compared with the threshold TH1, and the number of pixels in this group is compared with the threshold TH2.

If the confidence factor of the group is higher than the threshold TH1 and/or the number of pixels in the group is higher than the threshold TH2 (exit Y of the step 1102), the central pixel is considered as not a flying pixel. The central pixel is then retained in the depth map and the step 110 is completed.

Otherwise (exit N from the step 1102), in this embodiment wherein the step 110 comprises a step of correction, the step 1102 is followed by a step 1104 (block "SELECT NEXT PIXEL IN PATTERN").

In the step 1104, the image pixel following the pixel selected as scanning the image pixels of the current N*N pixel window, for example following the scanning 500 of the example of FIG. 5, is selected. In other words, the selected pixel is updated with, or becomes, the next image pixel in the scanning of the image pixels of the current N*N image pixel window.

The step 1104 is followed by a step 1106 (block "GROUP CONFIDENCE≥TH1, AND/OR GROUP OCCUR-RENCE≥TH2?"), the step 1106 is identical to the step 1102, except that the selected pixel is no more the central pixel as in step 1102, but the pixel selected in the previous step 1104.

If the confidence factor of the group to which the selected pixel belongs is higher than the threshold TH1 and that the number of pixels of this group is higher than the threshold TH2 (exit Y of the step 1106), the step 1106 is followed by a step 1108 (block "CENTRAL PIXEL=CURRENT PIXEL") during which the central pixel of the current window is replaced with the selected pixel, or in others words the distance calculated for the central pixel is replaced with the distance calculated for the selected pixel, or current pixel. The implementation of the step 1108 marks the end of the step 110.

Otherwise (exit N of the step 1106), the step 1106 is followed by a step 1110 (block "NEXT PIXEL IN PAT-TERN?") consisting in verifying whether it remains pixels in the current window that were not scanned.

If this is the case (exit Y of the step 1110), the step 1110 is followed by the step 1104 previously described.

Otherwise (exit N of the step 1110), it means that all the image pixels in the current N*N pixel window were scanned without finding even one image pixel allowing the central flying pixel to be replaced, i.e., without being capable of correcting the distance calculated for the central pixel by the distance calculated for another image pixel of the window. The step 1110 is then followed by a step 1112 (block "DISCARD CENTRAL PIXEL") during which the central pixel of the current window is discarded from the depth map. The step 1112 then marks the end of the step 110.

As an example, in an embodiment wherein the step 110 comprises no step of correcting the distance of the central pixel if it is identified as a flying pixel, then the steps 1104, 1106, 1108, and 1110 are omitted and the exit N of the step 1102 goes to the step 1112.

Referring back to FIG. 1, when the step 110 is completed, the method goes on to a step 112 (block "NEXT PIXEL?").

In this step 112, it is verified whether it remains at least one image pixel in the depth map obtained in the step 102 that has not yet been submitted to a process comprising defining a N*N image pixel window around this pixel and implementing the steps 106, 108, and 110 for this window.

If this is the case (exit N from the step 112), the method of obtaining of the depth map is completed (step 114—block "END").

Otherwise (exit Y from the step 112), the step 112 is followed by a step 116 (block "NEXT PIXEL SELECTION AND WINDOW DEFINITION").

In the step 116, a following image pixel of the depth map is selected among those having not yet been selected to be submitted to the process comprising defining a correspond-ing N*N pixel window, and implementing the steps 106, 108, and 110 for this window. Further, in this step 116, a new N*N image pixel window is defined, this window having the pixel selected in step 116 as central pixel and becoming the new current window. The step 116 is followed by the step 106 so that the steps 106, 108, and 110 are again imple-mented for this new current N*N image pixel window.

In FIG. 1, the confidence factor is calculated the same way for all the image pixels of the depth map obtained at the end of the step 102.

In the example of FIG. 1, the confidence factor of each image pixel of the N*N image pixel window used in each implementation of the step 108 is calculated in this step 108. In alternative examples, the confidence factor of each image pixel of a N*N image pixel window is calculated during the definition of this window, in step 104 or 116. In further alternative examples, the confidence factor of each image pixel of the depth map is calculated in the step 100, or in the step 102.

In FIG. 1, the thresholds TH1 and TH2 are identical for each implementation of the step 110. In other words, the thresholds TH1 and TH2 do not depend on the image pixel selected in step 104, or 116.

Similarly, the threshold th_d is the same for each implementation of the step 106.

Although it has not been detailed, for the image pixels located on the edges of the depth map, defining a N*N image pixel window around each of these image pixels of the edge of the depth map may comprise duplicating the central pixel of the window at each location of the window where the depth map do not comprise image pixels. Alternatively, the image pixels of the edge of the depth map around each of which it is not possible to define a N*N image pixel window of the depth map may simply not be processed.

Implementing the method of FIG. 1 allows obtaining from a depth map obtained at the end of the step 102, a new depth map in which the flying image pixels were identified, these identified flying pixels being either discarded from the new depth map, or, in embodiments and if possible, replaced with other image pixels of the depth map.

According to an embodiment, a preferred compromise between the speed of operation of the method of FIG. 1 and the quality of the correction of the image pixels identified as flying pixels is obtained for N equal to 5.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove. In particular, as it has been previously indicated, those skilled in the art will be able to determine each of the thresholds th_d, TH1, and TH2 used during the implementation of the described method.

What is claimed is:

1. A method comprising:
   a) for each image pixel of a depth map:
      a1) acquiring samples via a corresponding imager pixel and calculating a distance from the samples, and
      a2) defining a window of N*N image pixels with the image pixel at a center of the window, N being an odd integer equal to or greater than 3;
   b) for each window:
      b1) classifying the image pixels of the window into groups, the groups and the classification of the image pixels into the groups being determined by a distance threshold and the distances calculated for the image pixels of the window,
      b2) for each group of the window:
         calculating a number of image pixels in the group, and
         calculating a confidence factor of each image pixel and a confidence factor of the group equal to a sum of the confidence factors of the image pixels of the group, the confidence factor of each image pixel being determined from the samples acquired for the image pixel, and
      b3) scanning the image pixels of the window from a central image pixel by comparing, for each scanned image pixel, the confidence factor of the group of the image pixel with a first threshold and the number of image pixels in the group of the image pixel with a second threshold, and determining whether the central image pixel is retained or replaced with another image pixel of the window, or discarded from the depth map based on the comparisons.

2. The method according to claim 1, wherein in step b1), each group corresponds to a range of distances, and each image pixel of the window is classified into the group in response to the distance calculated for the image pixel is comprised in the range of distances of the group.

3. The method according to claim 2, wherein each range of distances has a width equal to twice the distance threshold, and the range of distances of the group comprising the central image pixel is centered on the distance calculated for the central image pixel.

4. The method according to claim 1, wherein each imager pixel belongs to an array of imager pixels of an indirect time of flight sensor.

5. The method according to claim 4, wherein in step a1), acquiring the samples comprises acquiring first samples when a scene to be imaged is irradiated by a signal at a first frequency, and second samples when the scene to be imaged is irradiated by a signal at a second frequency.

6. The method according to claim 5, wherein a highest of the first and second frequencies determines the distance threshold.

7. The method according to claim 5, wherein a maximum distance measurable without uncertainty using a highest of the first and second frequencies determines the distance threshold.

8. The method according to claim 7, wherein the distance threshold is equal to half the maximum distance measurable without uncertainty.

9. The method according to claim 5, wherein in step a1), calculating the distance comprises a phase unwrapping.

10. The method according to claim 1, wherein in step b3), the scanning the image pixels of the window is spiral-shaped.

11. The method according to claim 1, wherein the confidence factor of each image pixel is representative of a signal to noise ratio of the samples acquired in step a1) for the image pixel.

12. The method according to claim 1, wherein the confidence factor of each image pixel is a magnitude of a signal received by the corresponding imager pixel in step a1), or the magnitude squared divided by a dc component of the received signal.

13. The method according to claim 1, wherein the first threshold is empirically determined.

14. The method according to claim 1, wherein the second threshold is empirically determined.

15. A method comprising:
   a) for each image pixel of a depth map:
      a1) acquiring samples via a corresponding imager pixel and calculating a distance from the samples, each imager pixel belonging to an array of imager pixels of an indirect time of flight sensor, and

a2) defining a window of N*N image pixels with the image pixel at a center of the window, N being an odd integer equal to or greater than 3;

b) for each window:

b1) classifying the image pixels of the window into groups, the groups and the classification of the image pixels into the groups being determined by a distance threshold and the distances calculated for the image pixels of the window, each group corresponding to a range of distances, and each image pixel of the window being classified into the group in response to the distance calculated for the image pixel being comprised in the range of distances of the group, b2) for each group of the window:

calculating a number of image pixels in the group, and calculating a confidence factor of each image pixel and a confidence factor of the group equal to a sum of the confidence factors of the image pixels of the group, the confidence factor of each image pixel being determined from the samples acquired for the image pixel, and b3) scanning the image pixels of the window from a central image pixel by comparing, for each scanned image pixel, the confidence factor of the group of the image pixel with a first threshold and the number of image pixels in the group of the image pixel with a second threshold, and determining whether the central image pixel is retained or replaced with another image pixel of the window, or discarded from the depth map based on the comparisons.

16. The method according to claim 15, wherein each range of distances has a width equal to twice the distance threshold, and the range of distances of the group comprising the central image pixel is centered on the distance calculated for the central image pixel.

17. The method according to claim 15, wherein in step a1), acquiring the samples comprises acquiring first samples when a scene to be imaged is irradiated by a signal at a first frequency, and second samples when the scene to be imaged is irradiated by a signal at a second frequency.

16

18. A method comprising:

a) for each image pixel of a depth map:

a1) acquiring samples via a corresponding imager pixel and calculating a distance from the samples, and a2) defining a window of N*N image pixels with the image pixel at a center of the window, N being an odd integer equal to or greater than 3;

b) for each window:

b1) classifying the image pixels of the window into groups, the groups and the classification of the image pixels into the groups being determined by a distance threshold and the distances calculated for the image pixels of the window, b2) for each group of the window:

calculating a number of image pixels in the group, and calculating a confidence factor of each image pixel and a confidence factor of the group equal to a sum of the confidence factors of the image pixels of the group, the confidence factor of each image pixel being determined from the samples acquired for the image pixel, and b3) scanning, in a spiral pattern, the image pixels of the window from a central image pixel by comparing, for each scanned image pixel, the confidence factor of the group of the image pixel with a first threshold and the number of image pixels in the group of the image pixel with a second threshold, the first and second thresholds being empirically determined, and determining whether the central image pixel is retained replaced with another image pixel of the window, or discarded from the depth map based on the comparisons.

19. The method according to claim 18, wherein the confidence factor of each image pixel is representative of a signal to noise ratio of the samples acquired in step a1) for the image pixel.

20. The method according to claim 18, wherein the confidence factor of each image pixel is a magnitude of a signal received by the corresponding imager pixel in step a1), or the magnitude squared divided by a dc component of the received signal.

* * * * *